(12) United States Patent
Lai et al.

(10) Patent No.: US 9,414,107 B2
(45) Date of Patent: Aug. 9, 2016

(54) PLUGGABLE ELECTRONIC DEVICE AND METHOD FOR DETERMINING OUTPUT DATA OF PLUGGABLE ELECTRONIC DEVICE

(71) Applicant: Realtek Semiconductor Corp., HsinChu (TW)

(72) Inventors: Chao-Min Lai, Hsinchu (TW); Ming-Tsung Tsai, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 52 days.

(21) Appl. No.: 14/450,291

(22) Filed: Aug. 4, 2014

(65) Prior Publication Data

US 2015/0208026 A1      Jul. 23, 2015

(30) Foreign Application Priority Data

Jan. 22, 2014   (TW) .............................. 103102333 A

(51) Int. Cl.
*G06F 3/00*      (2006.01)
*G06F 13/12*    (2006.01)
*G06F 13/38*    (2006.01)
*G06F 13/00*    (2006.01)
*H04N 21/418*  (2011.01)
*H04N 5/46*     (2006.01)
*G06F 1/16*      (2006.01)
*G06F 3/14*      (2006.01)

(52) U.S. Cl.
CPC ............. *H04N 21/4183* (2013.01); *H04N 5/46* (2013.01); *G06F 1/1603* (2013.01); *G06F 1/1624* (2013.01); *G06F 3/14* (2013.01)

(58) Field of Classification Search
CPC ....... G06F 1/1601; G06F 1/3218; G06F 3/00; G06F 3/162
USPC .................................. 710/14, 63, 64, 67, 304
See application file for complete search history.

(56) References Cited

U.S. PATENT DOCUMENTS

| | | | |
|---|---|---|---|
| 2009/0248924 A1* | 10/2009 | Melin .............................. | 710/63 |
| 2010/0223407 A1* | 9/2010 | Dong et al. ...................... | 710/70 |
| 2010/0283532 A1* | 11/2010 | Horan et al. .................... | 327/530 |
| 2012/0173776 A1* | 7/2012 | Jones .............................. | 710/65 |
| 2012/0226846 A1* | 9/2012 | Chung ........................... | 710/305 |
| 2013/0179603 A1* | 7/2013 | Tu et al. .......................... | 710/15 |

* cited by examiner

*Primary Examiner* — Farley Abad
*Assistant Examiner* — Getente A Yimer
(74) *Attorney, Agent, or Firm* — Winston Hsu; Scott Margo

(57) ABSTRACT

A pluggable electronic device is provided, where the pluggable electronic device is used to connect to a display, the pluggable electronic device is used to generate data complied with a first standard or a second standard, and to transmit the data to the display. The pluggable electronic device includes: a control circuit for generating audio/video signals and control signals; a selection signal generating circuit for generating a selection signal according a determining result indicating whether the pluggable electronic device is connected to an external power source or not; a multiplexer, for receiving the audio/video signals and the control signals, and selectively generating the audio/video signals and the control signals complied with the first standard or the second standard according to the selection signal; and a connector for transmitting the audio/video signals and the control signals from the multiplexer to the display.

7 Claims, 4 Drawing Sheets

PLUGGABLE ELECTRONIC DEVICE AND METHOD FOR DETERMINING OUTPUT DATA OF PLUGGABLE ELECTRONIC DEVICE

BACKGROUND OF THE INVENTION

1. Field of the Invention

The present invention relates to a pluggable electronic device, and more particularly, to a pluggable electronic device connecting to a display.

2. Description of the Prior Art

The conventional smart TV dongle or WiFi display dongle generally outputs video data to a display via High-Definition Multimedia Interface (HDMI) or Mobile High-definition Link (MHL). By using these pluggable devices plugged on the TV, the TV may serve as a smart TV or the TV may have wireless display function.

However, MHL and HDMI on the TV side shares a connector, and the connector can auto-detect the pluggable device connected to the TV to determine that the pluggable device is complied with HDMI or MHL. Therefore, the pluggable device is only designed to be complied with one standard, that is HDMI or MHL, and the TV may determine the standard of the pluggable device and perform adequate operations. In addition, because not every TV supports MHL, the pluggable device complied with MHL may not be used when a user has a travel or a business travel and lives in a hotel whose TV does not support MHL standard, causing inconvenience to the user.

SUMMARY OF THE INVENTION

It is therefore an objective of the present invention to provide a pluggable electronic device and a method for determining output data of the pluggable electronic device, which can selectively output signals complied with HDMI or MHL, to solve the above-mentioned problems.

According to one embodiment of the present invention, a pluggable electronic device is provided, where the pluggable electronic device is used to connect to a display, the pluggable electronic device generates the output data complied with a first standard or a second standard, and transmits the output data to the display. The pluggable electronic device includes: a control circuit, for generating audio/video signals and control signals; a selection signal generating circuit, for generating a selection signal according to a determining result indicating whether the pluggable electronic device is connected to an external power source or not; a multiplexer, coupled to the control circuit and the selection signal generating circuit, for receiving the audio/video signals and the control signals, and selectively generating the audio/video signals and the control signals complied with the first standard or the second standard; and a connector, coupled to the multiplexer, for connecting to the display and transmitting the audio/video signals and the control signals from the multiplexer to the display.

According to another embodiment of the present invention, a method for determining output data of a pluggable device is provided, where the pluggable electronic device is used to connect to a display, the pluggable electronic device generates the output data complied with a first standard or a second standard, and transmits the output data to the display. The method includes: generating a selection signal according to a determining result indicating whether the pluggable electronic device is connected to an external power source or not; selectively generating audio/video signals and control signals complied with the first standard or the second standard; and transmitting the audio/video signals and the control signals to the display.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
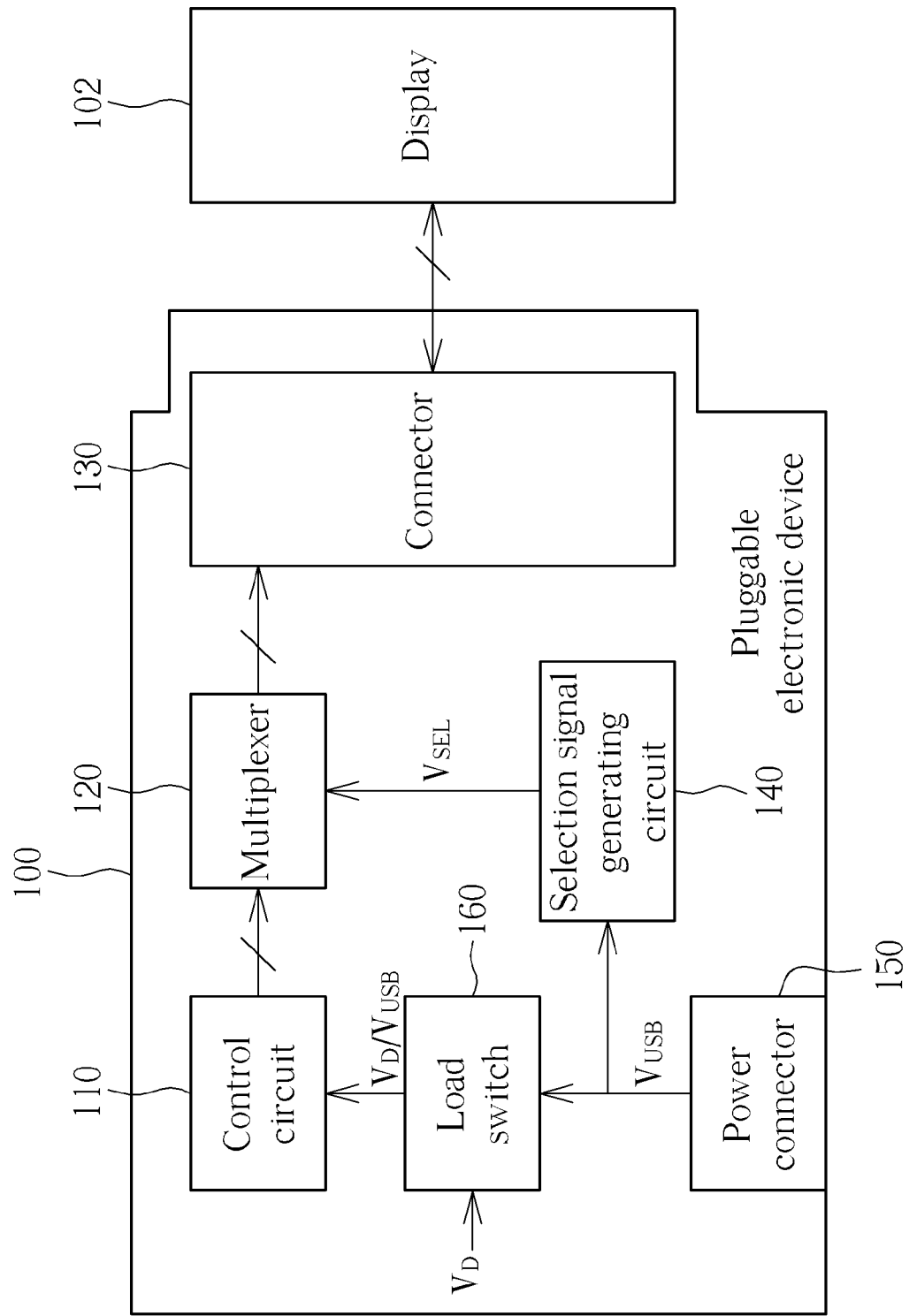
FIG. 1 is a diagram illustrating a pluggable electronic device according to one embodiment of the present invention.

Please refer to FIG. 1, which is a diagram illustrating a pluggable electronic device 100 according to one embodiment of the present invention. As shown in FIG. 1, the pluggable electronic device 100 comprises a control circuit 110, a multiplexer 120, a connector 130, a selection signal generating circuit 140, a power connector 150 and a load switch 160. In this embodiment, the pluggable electronic device 100 is a smart TV dongle, and the pluggable electronic device 100 is used to connect to a display 102 (e.g. a TV) to make the display 102 serve as a smart TV. The pluggable electronic device 100 can also be a WiFi display dongle, and the pluggable electronic device 100 is used to connect to the display 102, and to receive audio/video signals in a wireless manner and transmit the audio/video signals to the display 102.

In this embodiment, the connector 130 is complied with HDMI standard and MHL standard, and the connector 130 is used to connect to a HDMI/MHL connector of the display 102. The power connector 150 may be a Micro Universal Serial Bus (Micro USB) connector, and the power connector 150 can be connected to the display 102 or a USB connector of the other electronic device to receive power from the display 102 or the other electronic device to generate a supply voltage $V_{USB}$. However, these are not limitations of the present invention.

In the main operation of the pluggable electronic device 100, the pluggable electronic device 100 may selectively transmit HDMI signals or MHL signals to the display 102 according to a determining result indicating whether the pluggable electronic device 100 is connected to an external power source (i.e. whether the power connector 150 is connected to the external power source). In detail, the control circuit 110 generates audio/video signals and control signals to the multiplexer 120, at this time, the selection signal generating circuit 140 detects whether the power connector 150 is connected to the external power source to generate the supply voltage $V_{USB}$, and when the power connector 150 is connected to the external power source, the selection signal generating circuit 140 generates the selection signal $V_{SEL}$ having high voltage level to the multiplexer 120 to make the multiplexer 120 generate the audio/video signals and the control signals complied with the HDMI standard to the display 102 via the connector 130; otherwise, when the power connector 150 is not connected to the external power source, the selection signal generating circuit 140 generates the selection signal $V_{SEL}$ having low voltage level to the multiplexer 120 to make the multiplexer 120 generate the audio/video signals and the control signals complied with the MHL standard to the display 102 via the connector 130.

In addition, when the power connector 150 is connected to the external power source, the load switch 160 will transmits the supply voltage $V_{USB}$ to the control circuit 110 and other components of the pluggable electronic device 100. When the power connector 150 is not connected to the external power source, the multiplexer 120 generates the audio/video signals and the control signals complied with the MHL standard to the display 102, at this time, the display determines that the pluggable electronic device 100 is complied with the MHL standard, and the display 102 will transmits a supply voltage $V_D$ to the connector 130, and the load switch 160 will transmit the supply voltage $V_D$ to the control circuit 110 and other components of the pluggable electronic device 100.

Figure 2:
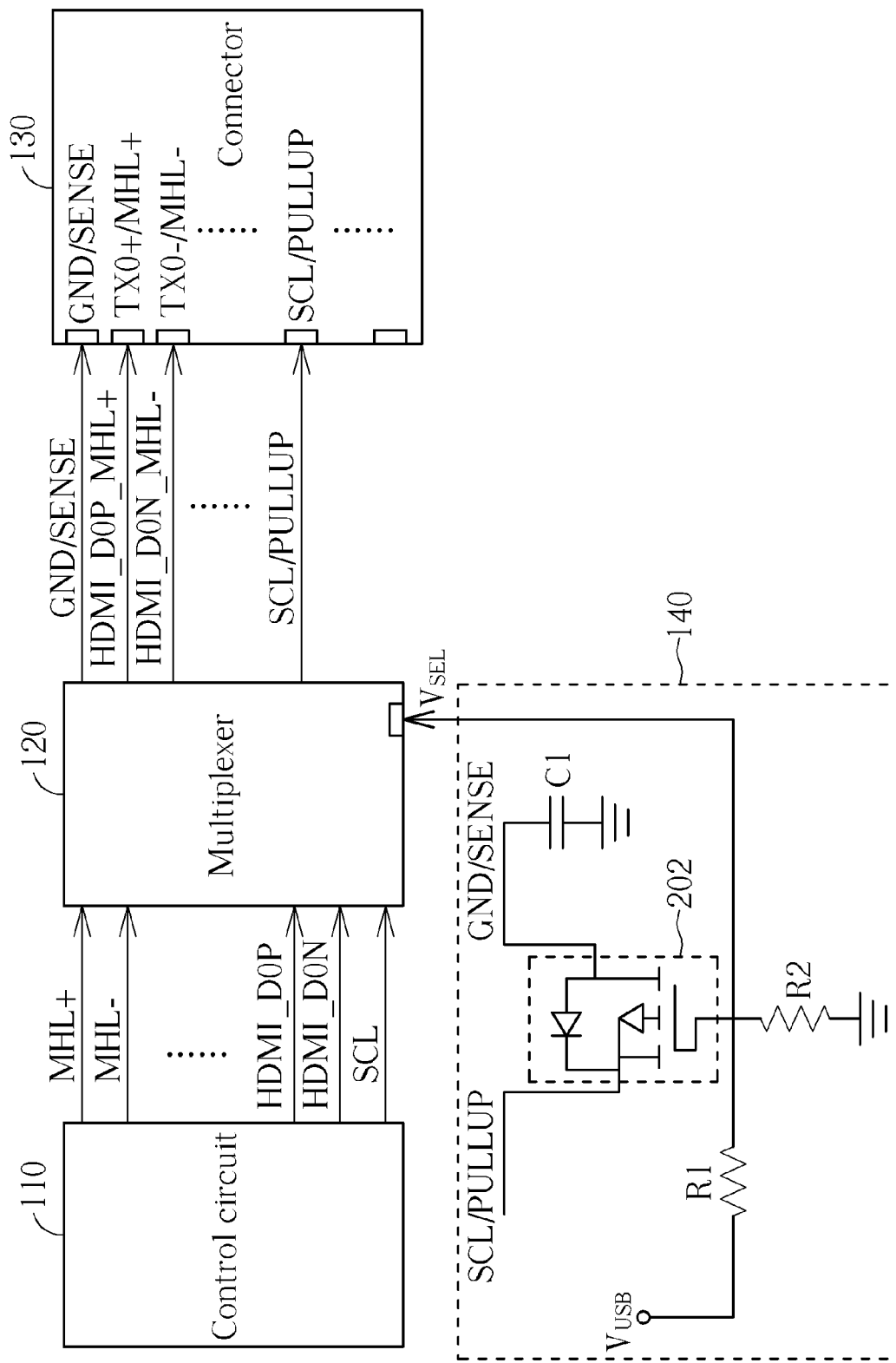
FIG. 2 is a diagram illustrating the control circuit, multiplexer, connector and the selection signal generating circuit according to one embodiment of the present invention.

Please refer to FIG. 2, which is a diagram illustrating the control circuit 110, multiplexer 120, connector 130 and the selection signal generating circuit 140 according to one embodiment of the present invention. As shown in FIG. 2, the control circuit 110 transmits at least data signals MHL+ and MHL− complied with MHL standard, data signals HDMI_DOP and HDMI_DON complied with HDMI standard, and a serial clock line signal SCL to the multiplexer 120. The connector 130 comprises at least a GND/SENSE pin for receiving/transmitting a ground signal of HDMI standard or a sense signal of MHL standard, a TX0+/MHL+ pin for receiving/transmitting the data signal HDMI_DOP of HDMI standard or the data signal MHL+ of MHL standard, a TX0−/MHL− pin for receiving/transmitting the data signal HDMI_DON of HDMI standard or the data signal MHL− of MHL standard, and a SCL/PULLUP pin for receiving/transmitting the serial clock line signal SCL of HDMI standard or a pull-up signal PULLUP of MHL standard. The above-mentioned pins of the connectors are used to receive the corresponding signals from the multiplexer 120. In addition, the selection signal generating circuit 140 comprises a setting circuit (in this embodiment, the setting circuit is implemented by a P-type transistor 202, but it is not a limitation of the present invention), two resistors R1 and R2, and a capacitor C1, where a control terminal (i.e. gate terminal) of the P-type transistor 202 is connected to the power connector 150 (i.e. the supply voltage $V_{SUB}$), a first terminal of the P-type transistor 202 is connected to the GND/SENSE pin of the connector 130, and a second terminal of the P-type transistor 202 is connected to the SCL/PULLUP pin of the connector 130.

It is noted that FIG. 2 only shows the signals and pins that is related to the disclosure of the present invention. A person skilled in this art should understand that the connector 130 supporting HDMI/MHL standards has nineteen pins, where the other pins are used to receive signals from the control circuit 110, multiplexer 120 or other components, further descriptions about these other pins are omitted here. In addition, part of signals shown in FIG. 2 may be transmitted via a single pin, that is the signal transmission shown in FIG. 2 is not a limitation of the present invention.

Referring to FIG. 2, in the operations of the selection signal generating circuit 140, when the power connector 150 is not connected to the external power source, the supply voltage $V_{SUB}$ shown in FIG. 2 will be a low voltage level (e.g. 0V), therefore, the P-type transistor 202 will be enabled to make the voltage level of the GDN/SENSE pin be pull-up by the SCL/PULLUP pin. At this time, when the voltage level of the GDN/SENSE pin is greater than a threshold voltage (e.g. 2V), the display 202 will detect this situation and confirm that the pluggable electronic device 100 is a MHL device. Therefore, the display 102 provides the supply voltage $V_D$ (e.g. 5V) to the pluggable electronic device 100. At this time, the supply voltage $V_{SUB}$ having low voltage level serves as the selection signal $V_{SEL}$ to be transmitted to the multiplexer 120, and the multiplexer 120 will be operated in a MHL mode to transmit the audio/video signals and control signals complied with MHL standard to the display 102 via the connector 130.

On the other hand, when the power connector 150 is connected to the external power source, the supply voltage $V_{SUB}$ shown in FIG. 2 will be a high voltage level (e.g. 5V), therefore, the P-type transistor 202 will not be enabled. At this time, the supply voltage $V_{SUB}$ serves as the selection signal $V_{SEL}$ to be transmitted to the multiplexer 120, and the multiplexer 120 will be operated in a HDMI mode to transmit the audio/video signals and control signals complied with HDMI standard to the display 102 via the connector 130. At this time, because the GND/SENSE pin has a low voltage level, the display 102 will not determine that the pluggable electronic device 100 is a MHL device, and therefore the display 102 will not provide the supply voltage $V_D$ to the pluggable electronic device 100.

According to the above-mentioned embodiments shown in FIG. 2, the pluggable electronic device 100 can simply determine to be operated in the HDMI mode or the MHL mode by determining whether the pluggable electronic device 100 is connected to the external power source or not, and generate the corresponding audio/video signals and control signals to the display 102.

Figure 3:
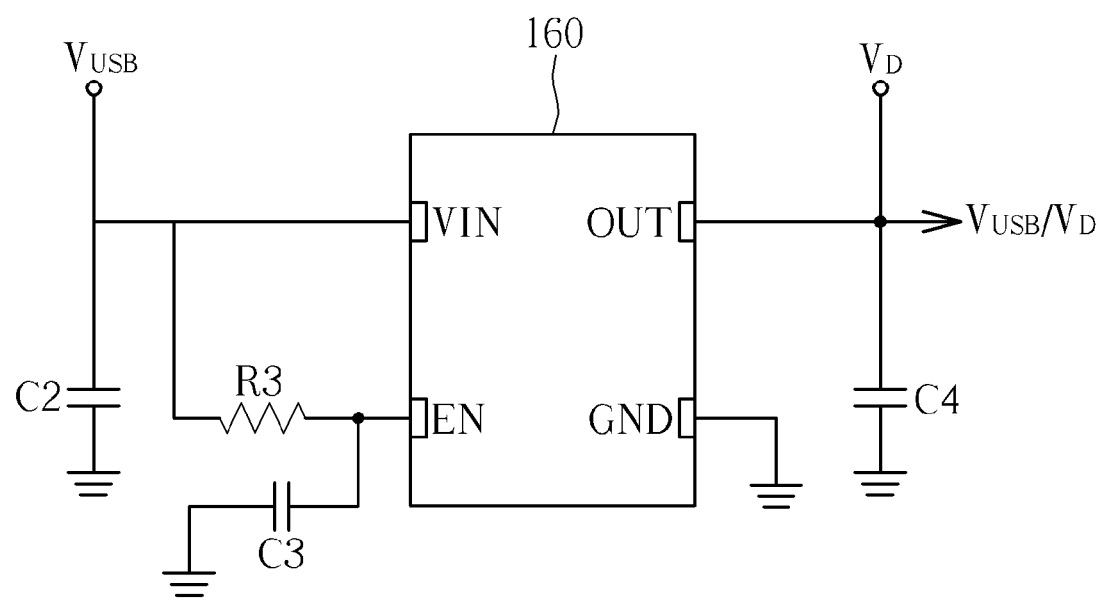
FIG. 3 is a diagram illustrating the load switch and its surrounding elements according to one embodiment of the present invention.

Please refer to FIG. 3, which is a diagram illustrating the load switch 160 and its surrounding elements according to one embodiment of the present invention. As shown in FIG. 3, the load switch 160 comprises an input terminal VIN, an enable terminal EN, an output terminal OUT and a ground terminal GND, where the input terminal VIN is connected to the supply voltage $V_{SUB}$, the enable terminal EN is connected to the supply voltage $V_{USB}$ via a resistor R3, the output terminal OUT is connected to the supply voltage $V_D$ and the output terminal OUT outputs the supply voltage $V_{USB}$ or the supply voltage $V_D$ to the control circuit 110. In addition, a capacitor C2 is positioned between the supply voltage $V_{SUB}$ and the ground, a capacitor C3 is positioned between the enable terminal EN and the ground, and a capacitor C4 is positioned between the supply voltage $V_D$ and the ground.

Please refer to FIG. 2 and FIG. 3 together. In the operations of the load switch 160, when the power connector 150 is not connected to the external power source, the supply voltage $V_{SUB}$ shown in FIG. 2 will be a low voltage level (e.g. 0V), and because the multiplexer 120 is operated under the MHL mode, the display 102 will provide the supply $V_D$ to the pluggable electronic device 100. At this time, as shown in FIG. 3, the supply voltage $V_D$ is directly transmitted to the control circuit 110 and other components of the pluggable electronic device 100 to serve as the supply voltage. On the other hand, when the power connector 150 is connected to the external power source, the supply voltage $V_{SUB}$ shown in FIG. 2 will be a high voltage level (e.g. 5V), and because the multiplexer 120 is operated under the HDMI mode, the display 102 will not provide the supply $V_D$ to the pluggable electronic device 100. Therefore, the load switch 160 will be enabled (i.e. the enable terminal EN receives the high voltage level supply voltage $V_{SUB}$) to transmit the supply voltage $V_{USB}$ to the control circuit 110 and other components of the pluggable electronic device 100 via the output terminal OUT to serve as the supply voltage.

It is noted that the resistor R3 and the capacitor C3 serve as a delay circuit, which may delay enabling the load switch 160 when the power connector 150 starts to connect the external power source (i.e. the voltage level of the supply voltage $V_{USB}$ is rising), to prevent the control circuit 110 and other components of the pluggable electronic device 100 from receiving the high voltage level supply voltage $V_{USB}$ and the high voltage level supply voltage $V_D$ simultaneously.

Figure 4:
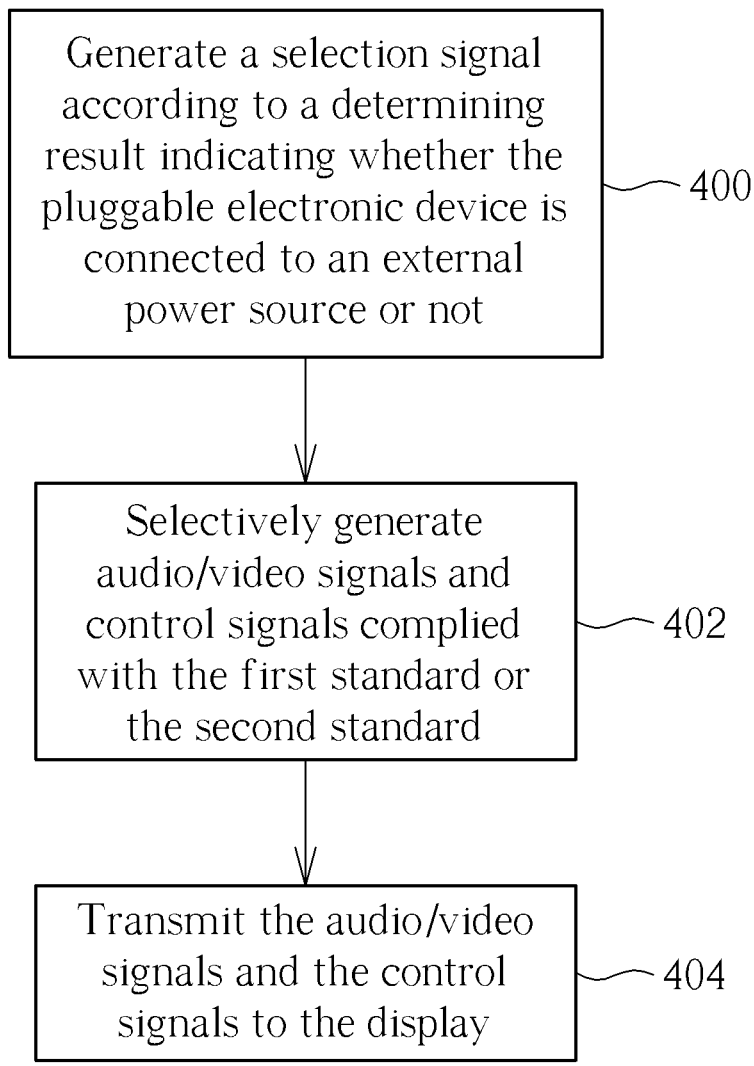
FIG. 4, which is a flowchart of a method for determining output data of the pluggable electronic device according to one embodiment of the present invention.

Please refer to FIG. 4, which is a flowchart of a method for determining output data of the pluggable electronic device according to one embodiment of the present invention. Please refer to FIG. 1 to FIG. 3 and the above-mentioned disclosure, the flow shown in FIG. 4 is as follows:

Step 400: generate a selection signal according to a determining result indicating whether the pluggable electronic device is connected to an external power source or not.

Step 402: selectively generate audio/video signals and control signals complied with the first standard or the second standard.

Step 404: transmit the audio/video signals and the control signals to the display.

Briefly summarized, in the pluggable electronic device and the method for determining output data of the pluggable electronic device of the present invention, the pluggable electronic device can automatically and actively detect whether the pluggable electronic device is connected to the external power source or not, and selectively output signals complied with HDMI standard or MHL standard to the display accordingly. Because the pluggable electronic device can be used in the TV supporting HDMI or MHL standard, the user does not need to buy two different pluggable electronic devices for different standards. In addition, the user does not need to set the pluggable electronic device. Therefore, the convenience for the user is increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pluggable electronic device, for connecting to a display, wherein the pluggable electronic device is utilized for generating data complied with a first standard or a second standard, and transmitting the data to the display, and the pluggable electronic device comprises:
   a control circuit, for generating audio/video signals and control signals;
   a selection signal generating circuit, for generating a selection signal according to a determining result indicating whether the pluggable electronic device is connected to an external power source for providing a supply voltage to the pluggable electronic device or not;
   a multiplexer, coupled to the control circuit and the selection signal generating circuit, for receiving the audio/video signals and the control signals, and selectively generating the audio/video signals and the control signals complied with the first standard or the second standard according to the selection signal; and
   a connector, coupled to the multiplexer, for connecting to the display and transmitting the audio/video signals and the control signals from the multiplexer to the display;
   wherein when the pluggable electronic device is connected to the external power source, the selection signal generating circuit generates the selection signal to the multiplexer to make the multiplexer generate the audio/video signals and the control signals complied with the first standard; and
   when the pluggable electronic device is not connected to the external power source, the selection signal generating circuit generates the selection signal to the multiplexer to make the multiplexer generate the audio/video signals and the control signals complied with the second standard.

2. The pluggable electronic device of claim 1, wherein the first standard is High-Definition Multimedia Interface (HDMI), and the second standard is Mobile High-definition Link (MHL).

3. The pluggable electronic device of claim 2, wherein the connector comprises a first pin and a second pin, the first pin is a ground pin of HDMI standard or a sense pin of MHL standard, and the second pin is a serial clock line signal pin of HDMI standard or a pull-up pin of MHL standard, and the pluggable electronic device further comprises:
   a setting circuit, for selectively connecting the first pin to the second pin according to whether the pluggable electronic device is connected to the external power source or not.

4. The pluggable electronic device of claim 1, further comprising:
   a power connector, for connecting the external power source; and
   a load switch, wherein the load switch comprises an input terminal and an output terminal, the input terminal is for connecting a first supply voltage of the external power source via the power connector, the output terminal is for connecting a second supply voltage provided by the display via the connector, and the output terminal is also for generating an output voltage for the use of the pluggable electronic device;
   wherein when the power connector is connected to the external power source, the output terminal of the load switch outputs the first supply voltage for the use of the pluggable electronic device; and
   when the power connector is not connected to the external power source, the pluggable electronic device utilizes the second supply voltage provided by the display.

5. A method for determining output data of a pluggable electronic device, wherein the pluggable electronic device is utilized to connect to a display, the pluggable electronic device generates the output data complied with a first standard or a second standard, and transmits the output data to the display, and the method comprises:
   generating a selection signal according to a determining result indicating whether the pluggable electronic device is connected to an external power source for providing a supply voltage to the pluggable electronic device or not, wherein when the pluggable electronic device is connected to the external power source, the audio/video signals and the control signals complied with the first standard are generated according to the selection signal;

selectively generating audio/video signals and control signals complied with the first standard or the second standard according to the selection signal, wherein when the pluggable electronic device is not connected to the external power source, the audio/video signals and the control signals complied with the second standard are generated according to the selection signal; and transmitting the audio/video signals and the control signals to the display.

6. The method of claim 5, wherein the first standard is High-Definition Multimedia Interface (HDMI), and the second standard is Mobile High-definition Link (MHL).

7. The method of claim 6, wherein the pluggable electronic device comprises a connector for transmitting the audio/video signals and the control signals to the display, the connector comprises a first pin and a second pin, the first pin is a ground pin of HDMI standard or a sense pin of MHL standard, and the second pin is a serial clock line signal pin of HDMI standard or a pull-up pin of MHL standard, and the method further comprises:

selectively connecting the first pin to the second pin according to whether the pluggable electronic device is connected to the external power source or not.

* * * * *